United States Patent
Perez-Cruz et al.

(10) Patent No.: US 9,954,669 B2
(45) Date of Patent: Apr. 24, 2018

(54) METHOD AND APPARATUS FOR OVER-THE-AIR ANCHOR-ANCHOR SYNCHRONIZATION

(71) Applicant: Alcatel-Lucent USA Inc., Murray Hill, NJ (US)

(72) Inventors: Fernando Perez-Cruz, New York, NY (US); Howard Huang, New York, NY (US); Kareem Bonna, Freehold, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 14/989,234

(22) Filed: Jan. 6, 2016

(65) Prior Publication Data

US 2017/0195109 A1 Jul. 6, 2017

(51) Int. Cl.
*G01S 5/02* (2010.01)
*G01S 5/14* (2006.01)
*H04L 7/00* (2006.01)
*G01S 5/00* (2006.01)
*G01S 5/06* (2006.01)

(52) U.S. Cl.
CPC .......... *H04L 7/0008* (2013.01); *G01S 5/0081* (2013.01); *G01S 5/02* (2013.01); *G01S 5/021* (2013.01); *G01S 5/0221* (2013.01); *G01S 5/06* (2013.01); *G01S 5/14* (2013.01)

(58) Field of Classification Search
CPC ........ G01S 5/0273; G01S 5/14; H04W 4/008; H04W 4/04; H04W 84/18
See application file for complete search history.

(56) References Cited

U.S. PATENT DOCUMENTS

| | | | |
|---|---|---|---|
| 2012/0120874 A1* | 5/2012 | McLaughlin | H04W 56/002 370/328 |
| 2013/0021206 A1* | 1/2013 | Hach | G01S 5/06 342/451 |
| 2015/0247915 A1 | 9/2015 | Huang et al. | |
| 2016/0353238 A1* | 12/2016 | Gherardi | H04W 4/021 |
| 2017/0128814 A1* | 5/2017 | Ianni | A63B 71/0605 |

OTHER PUBLICATIONS

Lanzisera, S. et al, "Radio Frequency Time-of-Flight Distance Measurement for Low-Cost Wireless Sensor Localization", IEEE Sensors Journal, vol. 11, No. 3, Mar. 2011. pp. 837-845.
Fernando Perez-Cruz et al, U.S. Appl. No. 14/706,339; "Method and Apparatus for Determining Non-Line of Sight Bias Estimation", filed May 7, 2015.
PCT/US2017/012375 Notification of Transmittal of the International Search Report and the Written Opinion of the International Searching Authority, or the Declaration dated Apr. 7, 2017.
(Continued)

*Primary Examiner* — David S Huang
(74) *Attorney, Agent, or Firm* — Steven R. Santema

(57) ABSTRACT

Various embodiments provide a method and apparatus for providing improved anchor-anchor clock synchronization. In particular, the skew and offset of a second clock in reference to a first clock is determined based on measured transmit and receive times of at least two two-way transmissions between a first anchor using the first clock and a second anchor using the second clock.

13 Claims, 7 Drawing Sheets

(56) References Cited

OTHER PUBLICATIONS

Kiong Hui et al, Tdoa Localization Algorithm With Compensation of Clock Offset for Wireless Sensor Networks, China Communications, China Institute of Communications, Piscataway, New Jersey, USA, vol. 12, No. 10, Oct. 1, 2015, pp. 193-201.
Rajan Raj Thilak et al, Joint Ranging and Synchronization for an Anchorless Network of Mobile Nodes, IEEE Transactions on Signal Processing, IEEE Service Center, New York, New York, USA, vol. 63, No. 8, Apr. 1, 2015, pp. 1925-1940.
Kyoung-Lae Noh et al, Novel Clock Phase Offset and Skew Estimation Using Two-Way Timing Message Exchanges for Wireless Sensor Networks, IEEE Transactions on Communications, IEEE Service Center, Piscataway, New Jersey, USA, vol. 55, No. 4, Apr. 1, 2007, pp. 766-777.
Yik-Chung Wu et al, Clock Synchronization of Wireless Sensor Networks, IEEE Signal Processing Magazine, IEEE Service Center, Piscataway, New Jersey, USA, vol. 28, No. 1, Jan. 1, 2011, pp. 124-138.
Jun Zheng et al, Joint Time Synchronization and Localization of an Unknown Node in Wireless Sensor Networks, IEEE Transactions on Signal Processing, IEEE Service Center, New York, New York, USA, vol. 58, No. 3, Mar. 1, 2010, pp. 1309-1320.

\* cited by examiner

200

300

400

700

METHOD AND APPARATUS FOR OVER-THE-AIR ANCHOR-ANCHOR SYNCHRONIZATION

TECHNICAL FIELD

The invention relates generally to methods and apparatus for over-the-air anchor-anchor synchronization.

BACKGROUND

This section introduces aspects that may be helpful in facilitating a better understanding of the inventions. Accordingly, the statements of this section are to be read in this light and are not to be understood as admissions about what is in the prior art or what is not in the prior art.

In a first known synchronization scheme, Network Time Protocol (NTP), a two-way message including a transmission time stamp is transmitted between the master and slave and the the clock offset and symmetrical transmission time are calculated using simple algebra. In a second known synchronization scheme, Precision Time Protocol (PTP) (e.g., IEEE 1588), special hardware provides timestamps when messages depart from or arrive at a network port so the computations required for synchronization are more precise. In a third known synchronization scheme, Reference Broadcast Synchronization (RBS), a source broadcasts a signal received by two or more anchors and the relative time of reception among the anchors is used for synchronization. In a fourth known synchronization scheme, GPS synchronization, a GPS receiver co-located with each anchor is used to provide a global pulse-per-second (PPS) reference signal.

SUMMARY OF ILLUSTRATIVE EMBODIMENTS

Some simplifications may be made in the following summary, which is intended to highlight and introduce some aspects of the various exemplary embodiments, but such simplifications are not intended to limit the scope of the inventions. Detailed descriptions of a preferred exemplary embodiment adequate to allow those of ordinary skill in the art to make and use the inventive concepts will follow in later sections Various embodiments provide a method and apparatus for providing improved anchor-anchor clock synchronization. In particular, the skew and offset of a second clock in reference to a first clock is determined based on measured transmit and receive times of at least two two-way transmissions between a first anchor using the first clock and a second anchor using the second clock.

In a first embodiment, an apparatus is provided for providing object localization. The apparatus includes a data storage and a processor communicatively connected to the data storage. The processor being programmed to: retrieve a first plurality of transmit and receive message synchronization times associated with a first two-way synchronization message between a first anchor and a second anchor, wherein the first anchor comprises a first clock and the second anchor comprises a second clock; and wherein the first plurality of transmit and receive message synchronization times are associated with the first clock; retrieve a second plurality of transmit and receive message synchronization times associated with the first two-way synchronization message between the first anchor and the second anchor, wherein the second plurality of transmit and receive message synchronization times are associated with the second clock; retrieve a third plurality of transmit and receive message synchronization times associated with a second two-way synchronization message between the first anchor and the second anchor, wherein the third plurality of transmit and receive message synchronization times are associated with the first clock; retrieve a fourth plurality of transmit and receive message synchronization times associated with the second two-way synchronization message between the first anchor and the second anchor, wherein the fourth plurality of transmit and receive message synchronization times are associated with the second clock; and determine a clock skew and a clock offset based on the first, second, third and fourth plurality of transmit and receive message synchronization times, wherein the clock skew and clock offset correspond to the relationship between the first clock and the second clock.

In a second embodiment, an apparatus is provided for providing object localization. The apparatus includes a data storage and a processor communicatively connected to the data storage. The processor being programmed to: determine a plurality of clock skew and clock offset pairs associated with a corresponding plurality of anchor pairs, wherein the anchor pairs are selected from a plurality of participating anchors; determine a plurality of time of arrivals of a tag message received at at least three of the participating anchors; and determine a tag location associated with the tag message based on the plurality of time of arrivals and the plurality of clock skew and clock offset pairs.

In a third embodiment, a system is provided for providing object localization. The system includes a plurality of participating anchors and a tracking server. Each of the plurality of participating anchors comprising a corresponding one of a plurality of reference clocks, each of the plurality of participating anchors being configured to: transmit a first plurality of synchronization messages; record a first plurality of transmission times corresponding to the transmission times of the first plurality of synchronization messages based on the corresponding one of the plurality of reference clocks; receive a second plurality of synchronization messages; record a second plurality of reception times corresponding to the reception times of the second plurality of synchronization messages based on the corresponding one of the plurality of reference clocks; and determine a time of arrival associated with reception of a tag message based on the corresponding one of the plurality of reference clocks. The tracking server is communicatively connected to the plurality of participating anchors and is configured to: determine a plurality of clock skew and clock offset pairs associated with a corresponding plurality of anchor pairs based on at least a subset of the first plurality of transmission times and at least a subset of the second plurality of reception times, wherein the anchor pairs are selected from a plurality of participating anchors; determine a first plurality of time of arrivals corresponding to the time of arrival determined at at least three of the participating anchors; and determine a tag location associated with the tag message based on the first plurality of time of arrivals and the plurality of clock skew and clock offset pairs.

In a fourth embodiment, a method is provided for providing object localization. The method includes: retrieving a first plurality of transmit and receive message synchronization times associated with a first two-way synchronization message between a first anchor and a second anchor, wherein the first anchor comprises a first clock and the second anchor comprises a second clock; and wherein the first plurality of transmit and receive message synchronization times are associated with the first clock; retrieving a second plurality of transmit and receive message synchronization times associated with the first two-way synchronization message between the first anchor and the second anchor, wherein the second plurality of transmit and receive message synchronization times are associated with the second clock; retrieving a third plurality of transmit and receive message synchronization times associated with a second two-way synchronization message between the first anchor and the second anchor, wherein the third plurality of transmit and receive message synchronization times are associated with the first clock; retrieving a fourth plurality of transmit and receive message synchronization times associated with the second two-way synchronization message between the first anchor and the second anchor, wherein the fourth plurality of transmit and receive message synchronization times are associated with the second clock; and determining a clock skew and a clock offset based on the first, second, third and fourth plurality of transmit and receive message synchronization times, wherein the clock skew and clock offset correspond to the relationship between the first clock and the second clock.

In a fifth embodiment, a non-transitory computer-readable storage medium for providing object localization is provided. The storage medium includes instructions which, when executed by a computer, cause the computer to perform a method comprising: retrieving a first plurality of transmit and receive message synchronization times associated with a first two-way synchronization message between a first anchor and a second anchor, wherein the first anchor comprises a first clock and the second anchor comprises a second clock; and wherein the first plurality of transmit and receive message synchronization times are associated with the first clock; retrieving a second plurality of transmit and receive message synchronization times associated with the first two-way synchronization message between the first anchor and the second anchor, wherein the second plurality of transmit and receive message synchronization times are associated with the second clock; retrieving a third plurality of transmit and receive message synchronization times associated with a second two-way synchronization message between the first anchor and the second anchor, wherein the third plurality of transmit and receive message synchronization times are associated with the first clock; retrieving a fourth plurality of transmit and receive message synchronization times associated with the second two-way synchronization message between the first anchor and the second anchor, wherein the fourth plurality of transmit and receive message synchronization times are associated with the second clock; and determining a clock skew and a clock offset based on the first, second, third and fourth plurality of transmit and receive message synchronization times, wherein the clock skew and clock offset correspond to the relationship between the first clock and the second clock.

In some of the above embodiments, the processor is further programmed to or the method further includes: transmit(ting) the clock skew and the clock offset to at least one of the first anchor and the second anchor.

In some of the above embodiments, the first plurality of transmit and receive message synchronization times comprises a first transmit time representing the time stamp of when a first synchronization message is transmitted from the first anchor to the second anchor and a first receive time representing the time stamp of when a first reply synchronization message is received from the second anchor by the first anchor; the second plurality of transmit and receive message synchronization times comprises a second receive time representing the time stamp of when the first synchronization message is received from the first anchor by the second anchor and a second transmit time representing the time stamp of when the first reply synchronization message is transmitted from the first anchor to the second anchor; the third plurality of transmit and receive message synchronization times comprises a third transmit time representing the time stamp of when a second synchronization message is transmitted from the first anchor to the second anchor and a third receive time representing the time stamp of when a second reply synchronization message is received from the second anchor by the first anchor; the fourth plurality of transmit and receive message synchronization times comprises a fourth receive time representing the time stamp of when the second synchronization message is received from the first anchor by the second anchor and a fourth transmit time representing the time stamp of when the second reply synchronization message is transmitted from the first anchor to the second anchor; the first two-way synchronization message comprises the first synchronization message and the first reply synchronization message; and the second two-way synchronization message comprises the second synchronization message and the second reply synchronization message.

In some of the above embodiments, the processor is further programmed to or the method further includes: determin(ing) a first time of arrival of a tag message received at the first anchor; determin(ing) a second time of arrival of the tag message received at the second anchor; determin(ing) a third time of arrival of the tag message received at a third anchor; and determin(ing) a tag location associated with the tag message based on the first time of arrival, the second time of arrival, the third time of arrival, the clock skew and the clock offset.

In some of the above embodiments, the determination of the tag location comprises adjusting at least one of the first time of arrival and the second time of arrival based on the clock skew and the clock offset.

In some of the above embodiments, the plurality of participating anchors comprises a first anchor and a second anchor; the plurality of clock skew and clock offset pairs comprises a first-second clock skew and a first-second clock offset associated with the deviance of a second clock associated with the second anchor to a first clock associated with the first anchor; the plurality of time of arrivals comprises a first time of arrival associate with the time of arrival of the tag message at the first anchor and a second time of arrival associated with the time of arrival of the tag message at the second anchor; and the determination of the tag location comprises adjusting at least one of the first time of arrival and the second time of arrival based on the first-second clock skew and the first-second clock offset.

In some of the above embodiments, each of the plurality of participating anchors is represented in at least one of the plurality of anchor pairs.

In some of the above embodiments, at least a subset of the first plurality of synchronization messages are transmitted using a spreading code sequence.

In some of the above embodiments, at least a subset of the first plurality of synchronization messages are transmitted using a round robin transmission sequence.

In some of the above embodiments the processor is further programmed to or the method further includes: control(ling) the period that each of the participating anchors transmits the corresponding first plurality of synchronization messages.

BRIEF DESCRIPTION OF THE DRAWINGS

Various embodiments are illustrated in the accompanying drawings, in which.

To facilitate understanding, identical reference numerals have been used to designate elements having substantially the same or similar structure or substantially the same or similar function.

DETAILED DESCRIPTION OF ILLUSTRATIVE EMBODIMENTS

Figure 1:
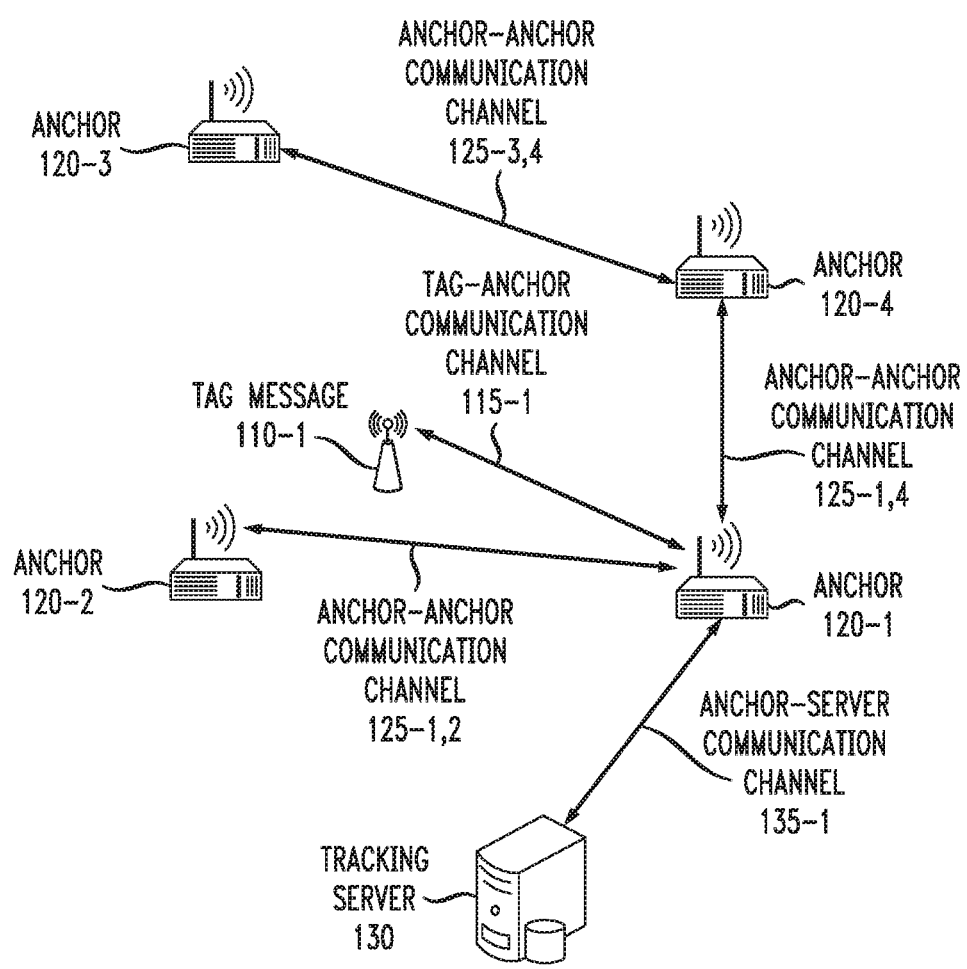
FIG. 1 illustrates a tag location network that includes an embodiment of a system 100 for providing over-the-air anchor-anchor synchronization.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

Various embodiments provide a method and apparatus for providing improved anchor-anchor clock synchronization. In particular, the skew and offset of a second clock in reference to a first clock is determined based on measured transmit and receive times of at least two two-way transmissions between a first anchor using the first clock and a second anchor using the second clock.

Advantageously, the various embodiments provide a solution necessarily rooted in computer technology in order to overcome a problem specifically arising in the realm of networks employing anchors that require synchronization to a common time reference. Specifically, decreasing the error introduced by the drift between clocks for the duration of the messages allows for improved synchronization between the anchor clocks and thusly, improved location accuracy in time-difference-of-arrival (TDoA) based localization. For example, if RF signals travel at about one foot a nanosecond, an error in the estimated timing offset on the order of a microsecond may result in a ranging error on the order of one thousand (1000) feet. As such, in order to have localization accuracy on the order of a few feet, the ranging error should be on the order of a few nanoseconds so that anchor synchronization is not the factor that limits TDoA localization performance. Known techniques may fail to provide such precision. For example, the synchronization accuracy of PTP may be on the order of 100 s of nanoseconds; in an RBS solution in a wireless network where the anchors are spaced by hundreds of feet, synchronization accuracy may be on the order of tens of microseconds; and the synchronization accuracy of a typical GPS receiver may be on the order of tens of nanoseconds. Note that GPS solutions are also limited in that they are not viable for in-door solutions.

It should be appreciated that other impairments such as a non-line-of-sight channel between the anchor and a tag and poor estimates of the time of arrival (ToA) due to inadequate signal processing may also impact the localization accuracy. In some embodiments, a lower bound on the variance of the ToA estimate is given by the Cramer-Rao Lower Bound (CRLB). The CRLB is a function of the received signal energy, noise power spectral density, and second order moment of the signal's spectrum.

It should be further appreciated that though described herein in relation to object localization, improved anchor-anchor clock synchronization may be applicable to any suitable application where anchor-anchor clock synchronization is important such as: network and packet monitoring, network security, authentication protocols and real-time media streaming.

FIG. 1 illustrates a tag location network that includes an embodiment of a system 100 for providing over-the-air anchor-anchor synchronization. The system 100 includes appropriate ones of tag messages (collectively, tag messages 110) such as tag messages 110-1 transmitted over a period of time to three or more anchors 120-1-120-4 (collectively, anchors 120) over an appropriate one or more of tag communication channels such as tag-anchor communication channel 115-1 (collectively, tag-anchor communication channels 115). Appropriate ones of anchors 120 communicate with tracking server 130 over an appropriate one or more of anchor-server communication channels such as server communication channel 135-1 (collectively, anchor-server communication channels 135). Appropriate ones of anchors 120 communicate with other ones of anchors 120 over an appropriate one or more of anchor-anchor communication channels such as anchor-anchor communication channels 125-1,2; 125-1,4; and 125-3,4 (collectively, anchor-anchor communication channels 125). For purposes of clarity, all of tag-anchor communication channels 115, anchor-anchor communication channels 125 and anchor-server communication channels 135 are not illustrated.

Tag messages 110 may include any type of message delivered by a tag over a period of time. A tag (not illustrated for purposes of clarity) may be any type of communication device(s) capable of sending a wireless signal (e.g., a tag message) over one or more of tag communication channels 115 (i.e., an uplink transmission). One or more tag messages may be delivered by the same tag over the period of time. It should be appreciated that while one (1) tag message is illustrated here, system 100 may include more tag messages. It should be appreciated that though described herein in the context of RF transmissions, a tag message may be any wave phenomena such as ultrasound or low-frequency sonar.

Anchors 120 may include any type of communication device(s) capable of receiving tag messages 110 over an appropriate one of tag-anchor communication channels 115, transmitting and receiving synchronization messages between appropriates ones of anchors 120 over appropriate ones of anchor-anchor communication channels 125, transmitting appropriate recorded transmit and receive times of the synchronization messages to tracking server 130 via an appropriate one of server-anchor communication channels 135, determining a time of arrival (ToA) of the tag message, and transmitting the ToA information and information identifying the tag message to tracking server 130 via an appropriate one of server-anchor communication channels 135. In particular, participating anchors 120 include respective reference clocks that allow the anchor to capture appropriate transmit and receive times of synchronization messages exchanged with an appropriate anchor pair during the synchronization process as described herein. Information identifying the tag message may be any suitable information enabling tracking server 130 to associate the ToA information with the corresponding tag message such as: (i) an identifier of the tag such as a tag id; (ii) an identifier of the tag message such as a tag message id; (iii) a timestamp; or (iv) the like.

In some embodiments, the anchor device is embedded in a communication device such as a thin client, a smart phone, a personal or laptop computer, server, network device, tablet, television set-top box, media player, automobile, Internet of Things device or the like. Communication devices may rely on other resources within exemplary system to perform a portion of tasks, such as processing or storage, or may be capable of independently performing tasks. It should be appreciated that while four anchors are illustrated here, system 100 may include fewer or more anchors. It should be appreciated that the system requires at least two anchors for one-dimensional localization, at least three anchors for two-dimensional localization and at least four anchors for three-dimensional localization. Moreover, the number of anchors at any one time may be dynamic as anchors may be added or subtracted from the system at various times during operation.

Tag-anchor communication channels 115 may be any suitable wireless connection capable of propagating tag messages 110 generated by a tag to one or more of anchors 120 such as radio frequency, ultrasonic, or visible light signals. It should be appreciated that though depicted as a single connection, communication channels 115 may be any number or combinations of communication channels.

Anchor-anchor communication channels 125 may be any suitable communication channel capable of propagating synchronization messages generated by one of anchors 120 to one or more others of anchors 120 such as: wireless communications (e.g., LTE, GSM, CDMA, Bluetooth, radio frequency, ultrasonic, or visible light signals); WLAN communications (e.g., WiFi); packet network communications (e.g., IP); broadband communications (e.g., DOCSIS and DSL); storage communications (e.g., Fibre Channel, iSCSI) and the like. It should be appreciated that though depicted as a single connection, communication channels 125 may be any number or combinations of communication channels. In some embodiments anchor-anchor communication channels 125 are configured to minimize network delays. In some of these embodiments, anchor-anchor communication channels 125 are suitable wireless communication channels.

Server-anchor communication channels 135 support communicating over one or more communication channels such as: wireless communications (e.g., LTE, GSM, CDMA, Bluetooth); WLAN communications (e.g., WiFi); packet network communications (e.g., IP); broadband communications (e.g., DOCSIS and DSL); storage communications (e.g., Fibre Channel, iSCSI) and the like. It should be appreciated that though depicted as a single connection, communication channels 135 may be any number or combinations of communication channels.

Tracking server 130 may be any apparatus capable of: (1) communicating over one or more appropriate server-anchor communication channels 135; (2) determining the clock skew and clock offset between reference clocks associated with participating ones of anchors 120; and (3) and determining the location of one or more of tag messages 110 based on the anchor message(s) received from one or more of anchors 120 and the determined clock skew and clock offsets. In particular, tracking server 130 determines the skew and offset associated with appropriate ones of the reference clocks associated with respective participating anchors using transmit and receive times of synchronization messages exchanged between anchor pairs during the synchronization process. Moreover, tracking server 130 determines tag locations based on the received anchor message(s) and the determined clock skews and offsets. It should be appreciated that while only one tracking server is illustrated here, system 100 may include more tracking servers. It should be further appreciated though depicted as communicating with anchors 120 via server-anchor communication channels 125, tracking server 130 may communicate with anchors 120 through any suitable communication network or may reside in the same device as one or more of anchors 120.

Figure 2:
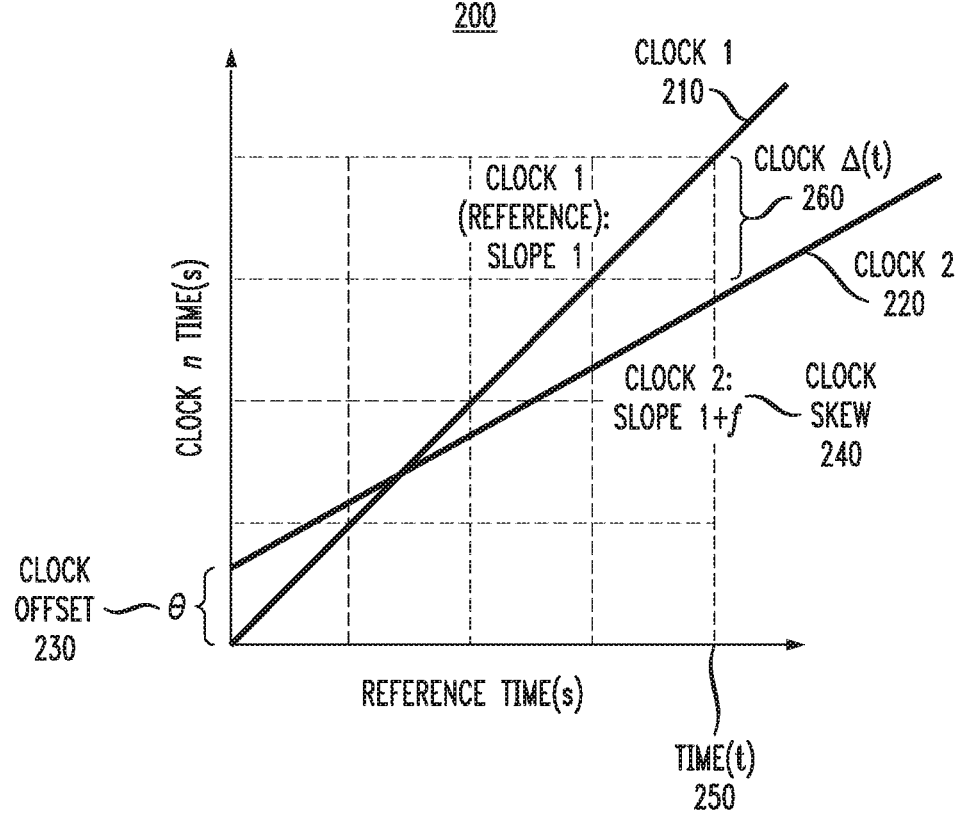
FIG. 2 is an exemplary clock model 200 illustrating the drift between a firsts reference clock (Clock 1 210) and a second clock (Clock 2 220)

FIG. 2 is an exemplary clock model 200 illustrating the drift between a firsts reference clock (Clock 1 210) and a second clock (Clock 2 220). For example, if clock 1 210 is the reference, the offset of clock 2 220 can be characterized by two parameters: the clock offset 230 (e.g., $\theta$) and the clock skew 240 (e.g., f). It should be appreciated that If the two clocks are perfectly synchronized, then $\theta=f=0$. It should be appreciated that commodity-grade oscillators have a rating on the order of 10 ppm, meaning that the skew is on the order of 10 μs. Advantageously, this linear model is valid over multiple seconds for commodity-grade oscillators under fixed environmental conditions.

Figure 3:
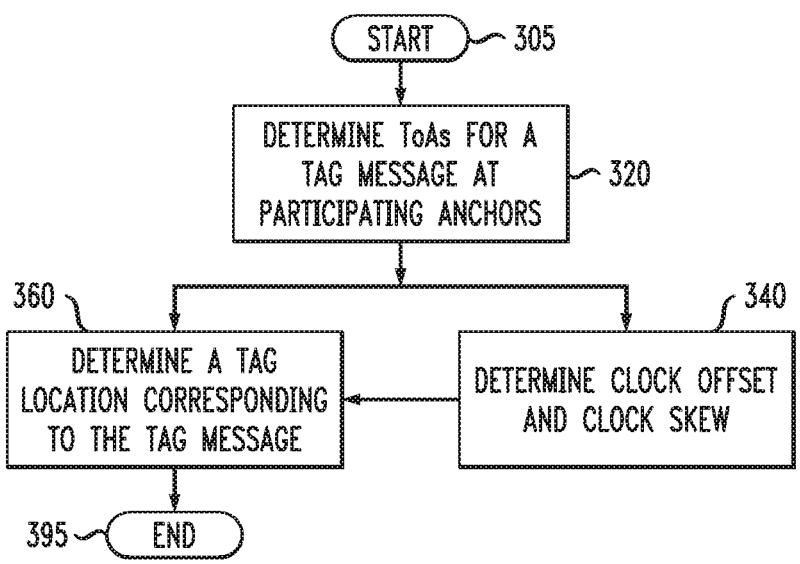
FIG. 3 depicts a flow chart illustrating an embodiment of a method 300 for an apparatus (e.g., tracking server 130 of FIG. 1) to determine a tag's (e.g., tag 110 of FIG. 1) location based on ToAs received from three or more anchors (e.g., three or more of anchors 120 of FIG. 1) and the collection of offset and skew between the reference clocks of the respective anchors.

FIG. 3 depicts a flow chart illustrating an embodiment of a method 300 for an apparatus (e.g., tracking server 130 of FIG. 1) to determine a tag's (e.g., tag 110 of FIG. 1) location based on ToAs received from three or more anchors (e.g., three or more of anchors 120 of FIG. 1) and the collection of offset and skew between the reference clocks of the respective anchors. The method starts at step 305 and includes: determining ToAs for a tag message at participating anchors (step 320); determining a clock offset and a clock skew of a second clock in relation to a first clock (step 340); determining a tag location corresponding to the tag message (step 360); and ending at step 395.

In the method 300, the step 320 includes determining ToAs for a tag message at participating anchors. In particular, a tag transmits a tag message (e.g., tag message 110-1 of FIG. 1) which is received by one or more participating anchors (e.g., appropriates ones of anchors 120 of FIG. 1). Each of the participating anchors estimate the ToA of the tag message and transmits the ToA and optional attendant information to the tracking server (e.g., tracking server 130 of FIG. 1). The tracking server determines the ToAs by retrieving the appropriate information from the messages received from the anchors or in the case where the tracking server is co-located with an anchor, the tracking server may determine the ToA by using the determined ToA. Optional attendant information may be any suitable information such as information associated with the tag message as described herein or information associated with the anchor such as: (i) an identifier of the anchor such as an anchor id or IP address; (ii) actual location information (e.g., GPS coordinates); or (iii) the like. Information associated with tag message enables the tracking server to associate the ToA information with a particular tag message and information associated with the anchor enables the tracking server to associate the ToA with a particular anchor or anchor location.

In the method 300, the step 340 includes determining one or more clock offset and clock skew pairs defining the difference between a clock associated with one or the participating anchors and another clock associated with another of the participating anchors as described herein.

In the method 300, the step 360 includes determining a tag location corresponding to the tag message. The tag location is determined based on the collective determined clock offsets and skews and the ToA received from at least a subset of the participating anchors. In particular, the determined clock offsets and skews are used to modify the ToA values received from one or more anchors in order to synchronize the ToA values to a common time reference. For example, referring to FIG. 2, the ToA measured at an anchor using reference clock 2 at Time(t) 250 is adjusted by the value of Clock $\Delta(t)$ 260 based on the stored values of clock offset 230 and clock skew 240. It should be appreciated that with a suitable collection of determined clock offsets and clock skews, the ToA values from the participating anchors may be adjusted as appropriate to improve synchronization of the received ToA values to a common reference clock. It should be further appreciated that clock skews and clock offsets are not required to be determined for each and every anchor pair in order to adjust a clock to a common time reference. For example, referring to FIG. 1, the clock skew and clock offset between a clock associated with anchor 120-3 and a clock associated with anchor 120-2 may be estimated by using the clock skew and clock offset between anchors 120-3 and a120-1 and the clock skew and clock offset between anchors 120-1 and 120-2.

In some embodiments of step 360, determining the tag location is based on time-difference-of-arrival (TDoA)-based localization. The TDoA calculation is based on an extension of trilateration—the process of determining absolute or relative locations of points by measurement of distances, using the geometry of circles, spheres or triangles. In some of these embodiments, the localization of the tag is estimated based on the corrected ToA estimation for each of the participating anchors and a NLOS bias probabilistic model that converts individual time estimates into positions in space such as described in U.S. Ser. No. 14/706,339 filed on May 7, 2015, which we incorporate by reference.

Figure 4:
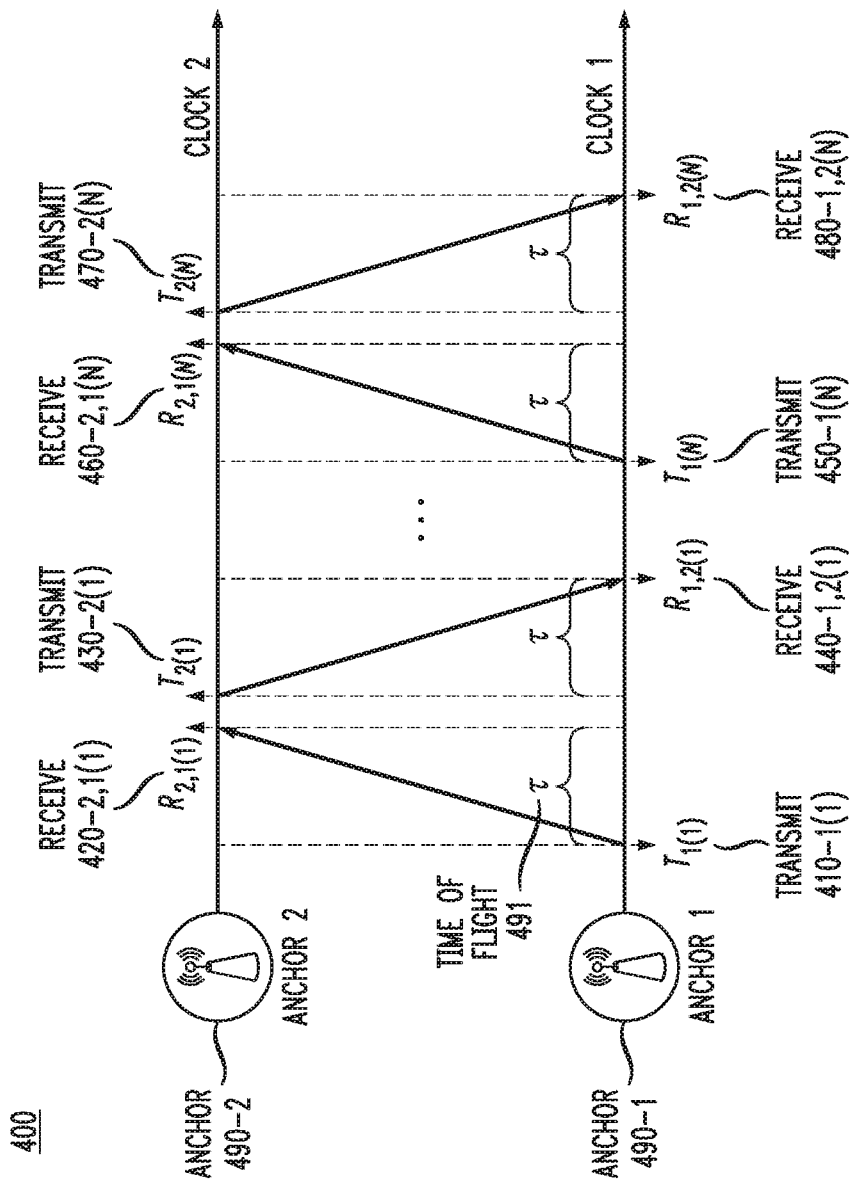
FIG. 4 depicts a timing diagram illustrating the exchange of synchronization messages between two anchors and is referenced below in relation to method 500.

FIG. 4 depicts a timing diagram illustrating the exchange of synchronization messages between two anchors and is referenced below in relation to method 500.

Figure 5:
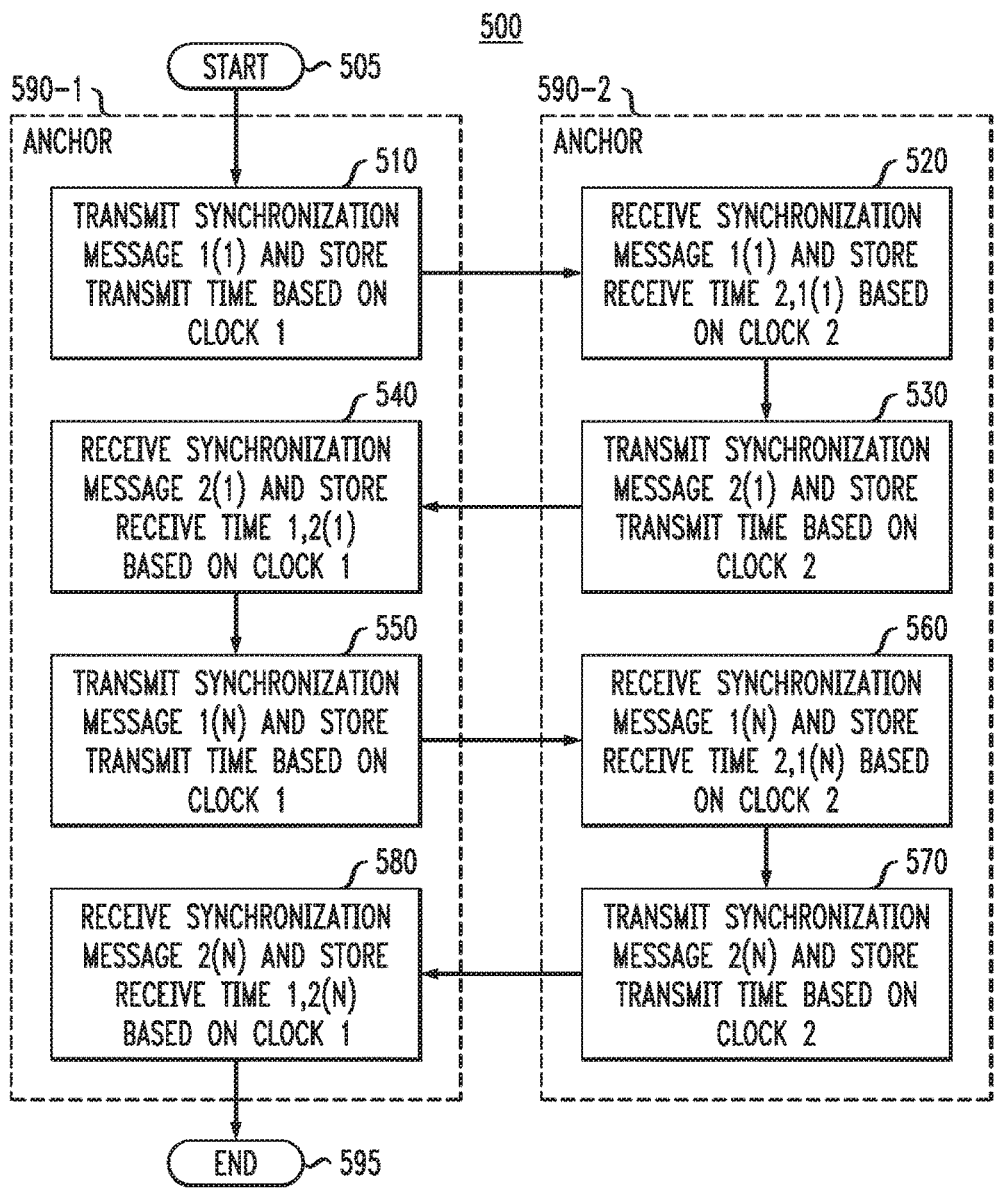
FIG. 5 depicts a flow chart illustrating an embodiment of a method 500 for a first anchor (e.g., anchor 490-1 of FIG. 4) to exchange synchronization messages with a second anchor (e.g., anchor 490-2 of FIG. 4)

FIG. 5 depicts a flow chart illustrating an embodiment of a method 500 for a first anchor (e.g., anchor 490-1 of FIG. 4) to exchange synchronization messages with a second anchor (e.g., anchor 490-2 of FIG. 4). Anchor 590-1 includes a first clock (e.g., Clock 1 of FIG. 4) and anchor 590-2 includes a second clock (e.g., Clock 2 of FIG. 4). For the case of two anchor clocks, solving the synchronization problem is equivalent to determining the clock offset and skew of clock 2, relative to the reference clock 1. This is achieved by performing a series of N two-way transmissions from the first anchor to the second anchor and from the second anchor to the first anchor. Note that if there are transmissions only in one direction (e.g., from the first anchor to the second anchor), it would not be possible to solve separately for the clock offset $\theta$ (e.g., clock offset 230 in FIG. 2) and the time-of-flight $\tau$. This is why the two-way transmission is required.

The method starts at step 505 and includes: transmitting by anchor 590-1 a synchronization message 1(1) and recording the transmission time with respect to the first clock (e.g., transmit 410-1(1) of FIG. 4) (step 510); receiving by anchor 590-2 the synchronization message 1(1) and recording the receive time with respect to the second clock (e.g., receive 420-2,1(1) of FIG. 4) (step 520); transmitting by anchor 590-2 a synchronization message 2(1) and recording the transmission time with respect to the second clock (e.g., transmit 430-2(1) of FIG. 4) (step 530); receiving by anchor 590-1 the synchronization message 2(1) and recording the receive time with respect to the first clock (e.g., receive 440-1,2(1) of FIG. 4) (step 540); transmitting by anchor 590-1 a synchronization message 1(N) and recording the transmission time with respect to the first clock (e.g., transmit 450-1(N) of FIG. 4) (step 550); receiving by anchor 590-2 the synchronization message 1(N) and recording the receive time with respect to the second clock (e.g., receive 460-2,1(N) of FIG. 4) (step 560); transmitting by anchor 590-2 a synchronization message 2(N) and recording the transmission time with respect to the second clock (e.g., transmit 470-2(N) of FIG. 4) (step 570); receiving by anchor 590-1 the synchronization message 2(N) and recording the receive time with respect to the first clock (e.g., receive 480-1,2(1) of FIG. 4) (step 580); and ending at step 595.

In some embodiments of the method 500, the $N^{th}$ two-way transmission is the two-way transmission immediately following the first two-way transmission (i.e., synchronization messages 1(2) and 2(2)).

In some embodiments of the method 500, transmit time and receive time measurements are performed at the physical layer. Advantageously, measuring times at the physical layer in comparison to including data in the payload of the broadcast signal, decreases randomness due to the assembling of the message payload.

In some embodiments of the method 500, transmit time and receive time measurements are recorded by transmitting the times from the respective anchor (e.g., one of anchors 120 of FIG. 1) to a tracking server (e.g., tracking server 130 of FIG. 1).

In some embodiments, two or more anchor pairs perform the steps of method 500.

In a first embodiment having two or more anchor pairs, synchronization messages are sent in a time-duplexed fashion.

In a second embodiment having two or more anchor pairs, synchronization messages are sent using spreading code sequences. It should be appreciated that if the number of anchors is large, the time for all anchors to transmit in a time-duplexed fashion may be so large that the linear clock model is no longer applicable. Moreover, if the synchronization messages (e.g., reference signals) are not well designed, multiple signals arriving at the same time at a receiver of a one anchor from different anchors may not be reliably detected. Advantageously, the use of distinct code spreading sequences (such as in CDMA) to differentiate transmissions from different anchors may reduce the time between anchor transmissions and provide robustness in the case overlapping signals. In some of these embodiments, well-known code sequences with low cross-correlation properties (e.g., Gold sequences) are used permitting multiple anchors to transmit simultaneously and have their sequences be detected by a single receiver, even if the signals are received with different chip delays.

Figure 6:
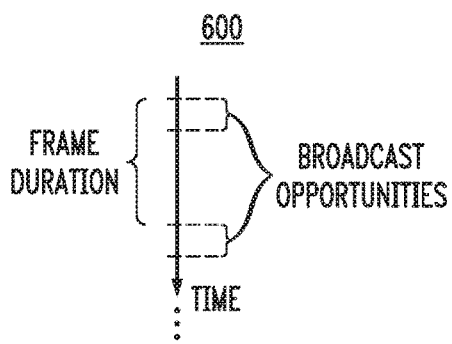
FIG. 6 depicts an exemplary frame structure having periodic broadcast opportunities once per frame.

In some embodiments having two or more anchor pairs, the bandwidth used for synchronization messages is shared with communication messages. In some of these embodiments, the framing structure includes synchronization message broadcast opportunities once per frame. FIG. 6 depicts an exemplary frame structure having periodic broadcast opportunities once per frame. As shown in FIG. 6, a synchronization message "broadcast opportunity" occurs at the beginning of each frame. In some embodiments, a centralized entity (e.g., tracking server 130 of FIG. 1) controls the period that each of the participating anchors transmits, listens (i.e., measures the ToA of all reference signals within range), or is idle (i.e., neither transmits nor listens) during each broadcast opportunity. In some embodiments, this schedule is communicated over a control channel to each of the participating anchors and may be dynamically adjusted as necessary to address challenges such as an anchor joining or leaving the population of participating anchors or changes in clock accuracy over time. In some embodiments, the schedule is based on one or more clocks associated with the participating anchors and the frequency of synchronization messages is greater than or equal to a value to which the linear model for the one or more associated clocks is valid. In some of these embodiments, the frequency allows for at least two two-way transmissions within one (1) second and preferably within five tenths (0.5) of a second.

Figure 7:
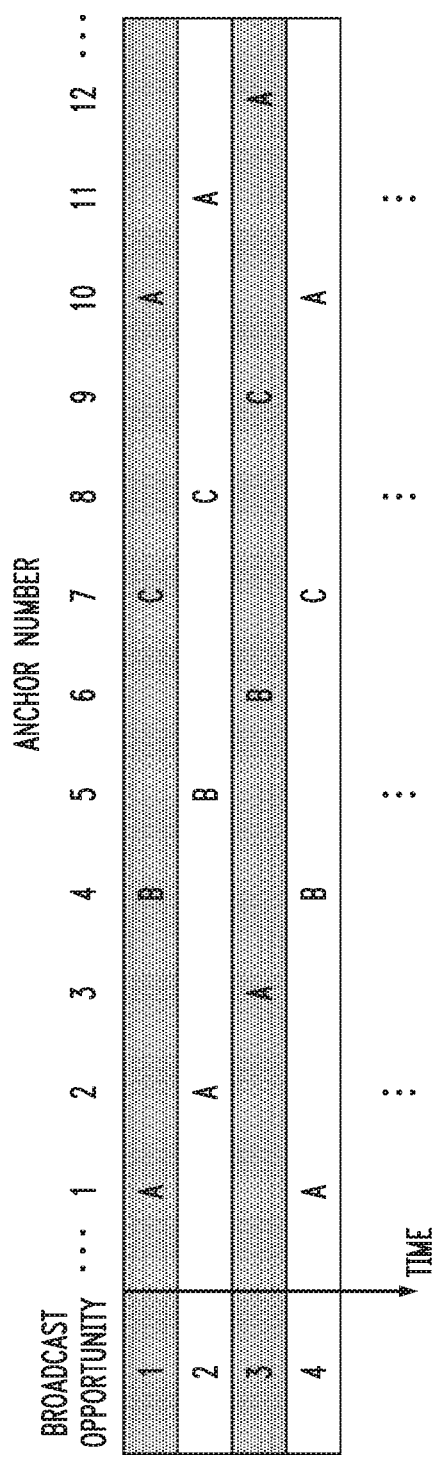
FIG. 7 depicts an exemplary round-robin transmission for a one-dimensional network of anchors.

In a third embodiment having two or more anchor pairs, synchronization messages are sent via round-robin transmitting. In particular, anchors transmit spreading code sequences as their synchronization messages (e.g., reference signals) based on a defined scheduled protocol where, for a given broadcast opportunity, one anchor transmits while other participating anchors in its vicinity listen. FIG. 7 depicts an exemplary round-robin transmission for a one-dimensional network of anchors. The letters represent the transmitted code sequence (A, B, or C) for a given anchor and broadcast opportunity during a frame. Anchor 4 transmits code B every third frame starting on broadcast opportunity (frame) 1. A set of three adjacent anchors transmit a given code sequence (either A, B, or C) in a round-robin fashion. Each anchor knows the schedule of code transmissions within its vicinity, so it can associate an anchor ID for any given code transmitted over a particular broadcast opportunity. For example, anchor 4 knows that if it hears code B during broadcast opportunity 2, the ToA it measures should be associated with anchor 5.

In some embodiments, the round-robin periodicity factor (3 frames in this example) is set to ensure each anchor hears a given neighbor a determined number of times per second, as determined by the time over which the linear clock model is valid. The code reuse factor (3 codes in this example) could be determined by the range or hearability of each transmission. Range or hearability may be determined in any suitable manner such as: (i) by the geographic distance; (ii) by the amplitude of the signal; (iii) by being provisioned (e.g., by tracking server 130 of FIG. 1); or (iv) the like. In this example, each anchor can hear its nearest 4 anchors on either side. If it could hear the 5th anchor or beyond, then there could be an ambiguity in the anchor ID. For example, if anchor 5 could hear up to the 5th nearest anchor, it would not be able to distinguish between anchors 1 and 10 during broadcast opportunities 1, 4, etc. In this case, the code reuse factor should be decreased (i.e., more codes should be used). It should be appreciated that the design principles for round-robin periodicity and code reuse described here for a one-dimensional network can be extended to two-dimensional networks.

In some embodiments having two or more anchor pairs, scheduling is achieved by each participating anchor autonomously deciding to listen, transmit, or be idle during a given broadcast opportunity. In some of these embodiments, the decision is made from the outcome of a random weighted coin toss. It should be appreciated that transmissions between a pair of anchors does not need to proceed in an ordered fashion. For example, a transmission from anchor 1 to 2 does is not required to be followed by a transmission from 2 to 1. Rather, the measurements simply need to occur within a window of time where the linear clock model is valid. Depending on the quality of the crystal, the validity of the linear model for the clock drift may typically last for a few hundreds of milliseconds to a few seconds. It should be appreciated that the drift of the clocks also drifts and the linear model for the clock drift might not be valid indefinitely.

In some embodiments, participating anchors (e.g., anchors 120 of FIG. 1) use full-duplex radios that are able to simultaneously transmit and listen on the same frequency band. For the example in FIG. 4, when anchor 4 transmits, it would be able to hear anchors 1 and 7 and estimate the time of arrival of synchronization messages as described herein for codes A and C, respectively.

In some embodiments, participating anchors (e.g., anchors 120 of FIG. 1) use a dedicated listening device. In some of these embodiments, one or more participating LTE eNodeBs implement a co-located device dedicated to estimating downlink positioning reference signals (PRSs) ToAs. It should be appreciated that downlink positioning reference signals may be used as synchronization messages. In some embodiments, the co-located device has its own antenna and is positioned at the base of an eNB tower, away from the radiating antenna. In some embodiments, the co-located device estimates the transmit time of the "parent" eNB and measure receive times of all other eNBs. In some embodiments, the co-located device has a dedicated communication link with the server (e.g., tracking server 130 of FIG. 1) for implementing the synchronization algorithm. Advantageously, no changes would be required for the existing LTE eNB to support this synchronization algorithm.

In some embodiments having two or more anchor pairs, when a new anchor is introduced to the system, the new anchor is assigned a spreading code which is not used by any of its neighbors within the hearability range. For example, the hearability range may include all of the neighboring anchors for which the new node is capable of decoding received synchronization messages. It should be appreciated that parameters such as signal strength and interference may impact which of the neighboring anchors may be heard and thus, a hearability range is not necessarily defined by geographic distances. In some of these embodiments, the new anchors determines the spreading code to use by listening for multiple frames and records the hearable sequences and selecting an unused spreading code. In some of these embodiments, the new anchor transmits to the tracking server the recorded sequences, and the tracking server assigns the anchor an unused code sequence. The tracking server or new anchor then notifies anchors within the new anchor's hearability range this assigned code. In some other embodiments, the new anchor autonomously picks a spreading code sequence to use and then notifies the server so that nearby anchors know to listen for it. It should be appreciate that it is not necessary to notify an anchor which code sequences to listen for, since an anchor could attempt to demodulate all known code sequences. However, attempting to demodulate all known code sequences may be computationally prohibitive, and thus, providing each participating anchor with a known list of sequences is advantageously more efficient.

Figure 8:
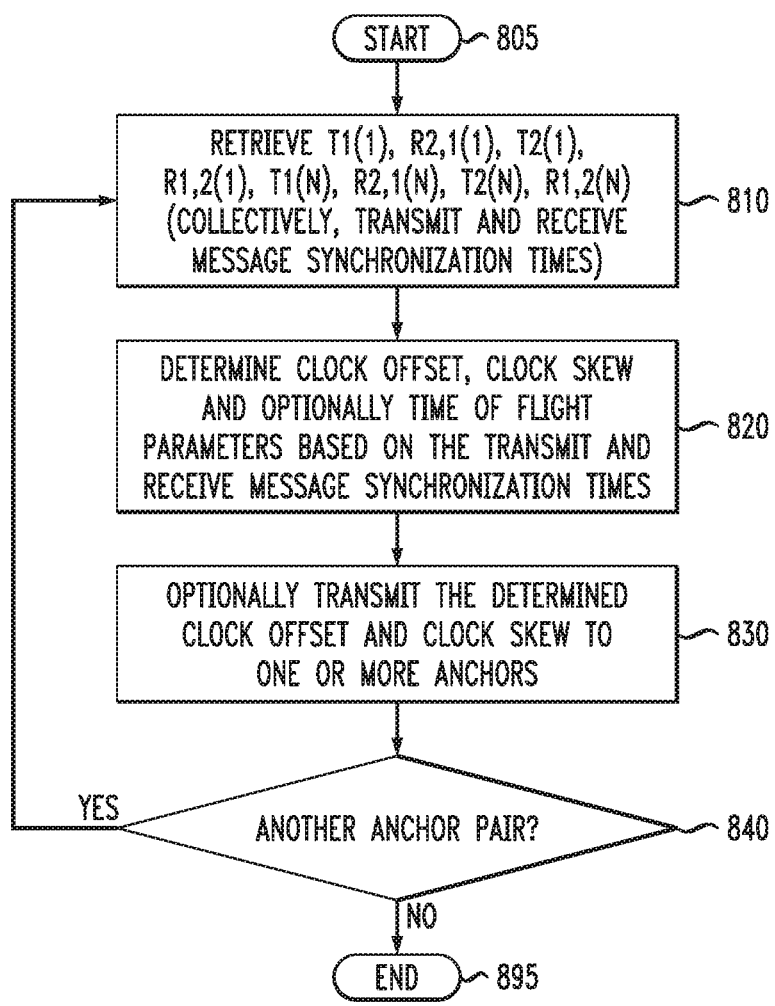
FIG. 8 depicts a flow chart illustrating an embodiment of a method 800 for an apparatus (e.g., tracking server 130 of FIG. 1) to synchronize a first clock (e.g., Clock 1 of FIG. 4) associated with a first anchor (e.g., anchor 490-1 of FIG. 4) with a second clock (e.g., Clock 2 of FIG. 4) associated with a second anchor (e.g., anchor 490-2 of FIG. 4) as illustrated in step 340 of FIG. 3.

FIG. 8 depicts a flow chart illustrating an embodiment of a method 800 for an apparatus (e.g., tracking server 130 of FIG. 1) to synchronize a first clock (e.g., Clock 1 of FIG. 4) associated with a first anchor (e.g., anchor 490-1 of FIG. 4) with a second clock (e.g., Clock 2 of FIG. 4) associated with a second anchor (e.g., anchor 490-2 of FIG. 4) as illustrated in step 340 of FIG. 3. The method starts at step 805 and includes: determining the transmit and receive synchronization times (step 810); determining the clock offset, clock skew and optionally time of flight parameters based on the determined transmit and receive synchronization times (step 820); optionally transmitting the determined clock offset and clock skew to one or more anchors (e.g., one or more of anchors 120 of FIG. 1) (step 830); and optionally determining if there is another anchor pair (step 840) and if so, proceeding to step 810, else ending at step 895.

In the method 800, the step 810 includes determining the recorded transmit and receive synchronization times for synchronization messages transmitted between a pair of anchors (e.g., anchor 490-1 and anchor 490-2 of FIG. 4). In particular, referring to FIG. 4, the determined recorded transmit and receive times include: transmit 410-1(1) (i.e., $T_{1(1)}$); receive 420-2,1(1) of FIG. 4 (i.e., $R_{2,1(1)}$); transmit 430-2(1) (i.e., $T_{2(1)}$); receive 440-1,2(1) (i.e., $R_{1,2(1)}$); transmit 450-1(N) (i.e., $T_{1(N)}$); receive 460-2,1(N) (i.e., $R_{2,1(N)}$); transmit 470-2(1) (i.e., $T_{2(N)}$); and receive 480-1,2(1) (i.e., $R_{1,2(N)}$) (collectively, transmit and receive message synchronization times). Transmit and receive message synchronization times may be determined using any suitable mechanism. For example, determination mechanisms include: i) receiving one or more transmit or receive times from one or more anchors (e.g., anchor 490-1 or 490-2); ii) retrieving one or more transmit or receive times from an external storage/database; iii) retrieving one or more transmit or receive times from internal storage/database (e.g., from storage internal to tracking server 130 of FIG. 1); iv) determining one or more transmit or receive times during one of the steps of method 500 (e.g., if tracking server 130 of FIG. 1 is co-resident with one of anchors 120 of FIG. 1); or v) the like.

In the method 800, the step 820 includes determining the clock offset, clock skew and optionally time of flight parameters based on the determined transmit and receive synchronization times. In particular, referring to FIG. 2, the clock skew (e.g., clock skew 240) and the clock offset (e.g., clock offset 230) of one clock (e.g., clock 2 220) in relation to another clock (e.g. clock 1 210) is determined. It should be appreciated that by determining the clock skew and clock offset between two clocks, synchronization between the two clocks may be improved. It should be further appreciated that the first and second clock are associated with respective anchors (e.g., in FIG. 4, Clock 1 is associated with anchor 490-1 and Clock 2 is associated with anchor 490-2). Advantageously, improved clock synchronization improves localization accuracy when using techniques such as Time of Arrival (ToA) synchronization.

It should be appreciated that since there are three unknowns, ($\theta$ (i.e., clock offset), f (i.e., clock skew), $\tau$ (i.e., time of flight)), the unknowns may be determined if there are at least 2 two-way transmissions to provide at least 4 equations. It should be appreciated that the time of flight may change over time as well as that the clock skew and offset may not be linear as modeled and thus, transmitting the synchronization messages more frequently will provide improved accuracy.

In some embodiments of the step 820, two two-way transmissions are used to estimate ($\theta$, f, $\tau$). In some of these embodiments, ($\theta$, f, $\tau$) are determined based on equations (1)-(4).

$$T_{1(1)} = \theta + (1+f)R_{2,1(1)} - \tau \qquad \text{(Eq. 1)}$$

$$R_{1,2(1)} = \theta + (1+f)T_{2(1)} + \tau \qquad \text{(Eq. 2)}$$

$$T_{1(n)} = \theta + (1+f)R_{2,1(2)} - \tau \qquad \text{(Eq. 3)}$$

$$R_{1,2(n)} = \theta + (1+f)T_{2(n)} + \tau \qquad \text{(Eq. 4)}$$

where:
where $\tau$ is the unknown time-of-flight, which we assume to be fixed for all 2N transmissions.
$\theta$=is the clock offset between clock 1 and clock 2 (e.g., clock offset 230 of FIG. 2);
f=is the clock skew between clock 1 and clock 2 (e.g., clock skew 240 of FIG. 2);
$T_{1(1)}$, $R_{2,1(1)}$, $T_{2(1)}$, $R_{1,2(1)}$=the transmit and receive times of the first two-way transmission as described above; and
$T_{1(N)}$, $R_{2,1(N)}$, $T_{2(N)}$, $R_{1,2(N)}$=the transmit and receive times of the $N^{th}$ two-way transmission as described above.

In some embodiments of the step 820, greater than two two-way transmissions are used. In some of these embodiments, the error in the transmit and receive times are assumed to be Gaussian distributed and a least-squares technique is used to estimate ($\theta$, f, $\tau$).

The method 800 optionally includes step 830. Step 830 includes transmitting the determined clock offset and clock skew to one or more anchors. In some of these embodiments, one or more anchors (e.g., anchors 120 of FIG. 1) perform step 360 of method 300. In some of these embodiments, the determined clock offset and clock skew reflect the offset and skew that may be used to synchronize two or more of the local anchor clocks to a common clock model. In some of these embodiments, one or more anchors synchronize their local clocks to the common clock model based on the received clock offset and clock skew (i.e., closed-loop synchronization). In some of these embodiments, the closed-loop synchronization is implemented with a phase-locked loop. Advantageously, closed-loop synchronization enables wireless techniques (e.g., MIMO coordinated multipoint processing) that require precise synchronization.

The method 800 optionally includes step 840. Step 840 includes determining if there is another anchor pair. In particular, in a system with greater than two anchors (e.g., anchors 120 of FIG. 1), steps 810-830 are repeated for each suitable anchor pair required to synchronize the participating anchors in the system. In particular, the determination requires an anchor tree that includes at least one path between each participating anchor. In some embodiments, the determination is based on a spanning tree of anchors. A spanning tree of anchors is defined as any suitable tree that includes one path between each anchor. For example, referring to FIG. 1, anchor-anchor communication channels 125 demonstrate a spanning tree between anchors 120 where each of participating anchors 120 exchange two-way synchronization messages in at least one anchor-anchor pair synchronization process. For example, synchronization messages are exchanged between: (1) anchor 120-1 and anchor 120-4 over anchor-anchor communication channel 125-1,4; (2) anchor 120-1 and anchor 120-2 over anchor-anchor communication channel 125-1,2; and (3) anchor 120-3 and anchor 120-4 over anchor-anchor communication channel 125-3,4. In this example, steps 810-830 will be repeated for the transmit and receive message synchronization times associated with each of the three respective synchronization message exchange pairs.

Advantageously, a spanning tree may require determining the skew for as little as N−1 anchor pairs as compared to the N(N−1)/2 actual anchor pairs available. A spanning tree may also be beneficial for distant nodes and allow for synchronizing participating anchors that are not within the hearability range. It should be appreciated that some of anchors 120 may not participate in the synchronization message sequence and as such, are not participating anchors in the enhanced synchronization methods described herein.

In some embodiments of the step 820, the time of flight is not fixed between the two anchors. For example, the time of flight may differ in each direction or over multiple broadcast opportunities if the physical distance between the two anchors is large or if the channel between the anchors is not line-of sight or is characterized by multipath. In some of these embodiments, determining the clock offset, clock skew and optionally time of flight parameters are based on the likelihood model exemplified in equations (5)-(6).

$$p(T_{1(n)}|\theta, f, \tau, R_{2,1(n)}) \quad \text{(Eq. 5)}$$

$$p(R_{1,2(n)}|\theta, f, \tau, T_{2(n)}) \quad \text{(Eq. 6)}$$

where τ is the unknown time-of-flight;
θ=is the clock offset between clock 1 and clock 2 (e.g., clock offset 230 of FIG. 2);
f=is the clock skew between clock 1 and clock 2 (e.g., clock skew 240 of FIG. 2);
$T_{1(n)}, R_{2,1(n)}, T_{2(n)}, R_{1,2(n)}$=the transmit and receive times of the $n^{th}$ two-way transmission as described above; and
p( )=the probability density function.

The inventors have found that the improvements in synchronization accuracy between anchors using methods 500 and 800 have achieved marked improvement in localization accuracy for LTE channel models. In particular, assuming that the randomness due to recording the transmission and receiving time is only characterized by the bandwidth and SNR of the transmitted signal and there is no additional random delays added by the transmitter/receiver, the quality of the synchronization was determined by the bandwidth and SNR via the CRLB and by the stability of the clock. As a proof concept, commodity software-defined radios were used to receive a 500 KHz signal at a short range and 4 consecutive transmissions to estimate the unknown parameters. Each transmission was separated by 170 ms and the clock had a nominal stability of about 10 ppm. Using the procedures of methods 300, 500 and 800, sub-nanosecond root mean squared error in the estimation of the time-of-flight was achieved.

Although primarily depicted and described in a particular sequence, it should be appreciated that the steps shown in methods 300, 500 and 800 may be performed in any suitable sequence. Moreover, the steps identified by one step may also be performed in one or more other steps in the sequence or common actions of more than one step may be performed only once.

It should be appreciated that steps of various above-described methods can be performed by programmed computers. Herein, some embodiments are also intended to cover program storage devices, e.g., data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable data storage media. The embodiments are also intended to cover computers programmed to perform said steps of the above-described methods.

Figure 9:
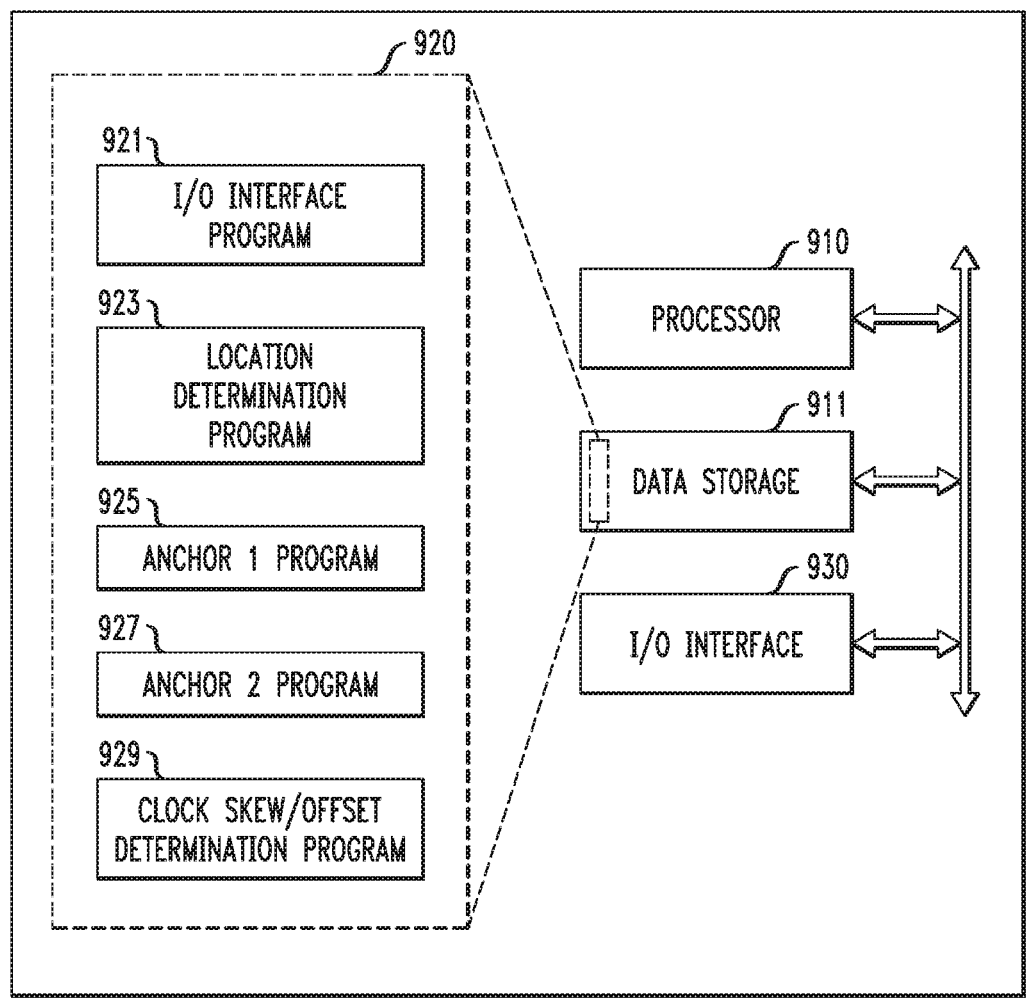
FIG. 9 schematically illustrates an embodiment of an apparatus 900 such as one of anchors 120 or tracking server 130 of FIG. 1.

FIG. 9 schematically illustrates an embodiment of an apparatus 900 such as one of anchors 120 or tracking server 130 of FIG. 1. The apparatus 900 includes processor 910, data storage 911, and I/O interface 930.

The processor 910 controls the operation of the apparatus 900. The processor 910 cooperates with the data storage 911.

The data storage 911 stores appropriate ones of programs 920 executable by the processor 910. Data storage 911 may also optionally store program data such as NLOS bias distributions, ToA values or the like as appropriate.

The processor-executable programs 920 may include an I/O interface program 921, a location determination program 923, anchor 1 program, 925 anchor 2 program 927 or Clock Skew/Offset Determination Program 929. Processor 910 cooperates with processor-executable programs 920.

The I/O interface 930 cooperates with processor 910 and I/O interface program 921 to support communications over communication channels 115, 125 or 135 of FIG. 1 as appropriate and as described above.

The location determination program 923 performs the steps of FIG. 3 as appropriate and as described above.

The anchor 1 program 925 performs steps 510, 540, 550 and 580 of FIG. 5 as appropriate and as described above.

The anchor 2 program 927 performs steps 520, 530, 560 and 570 of FIG. 5 as appropriate and as described above.

The Clock Skew/Offset Determination Program 929 performs steps of FIG. 8 as described above.

In some embodiments, the processor 910 may include resources such as processors/CPU cores, the I/O interface 930 may include any suitable network interfaces, or the data storage 911 may include memory or storage devices. Moreover the apparatus 900 may be any suitable physical hardware configuration such as: one or more server(s), blades consisting of components such as processor, memory, network interfaces or storage devices. In some of these embodiments, the apparatus 900 may include cloud network resources that are remote from each other.

In some embodiments, the apparatus 900 may be virtual machine. In some of these embodiments, the virtual machine may include components from different machines or be geographically dispersed. For example, the data storage 911 and the processor 910 may be in two different physical machines.

When processor-executable programs 920 are implemented on a processor 910, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively connected to any suitable arrangement of devices; storing information in any suitable combination of memory(s), storage(s) or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGS., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus for providing object localization, the apparatus comprising:
   a data storage; and
   a processor communicatively connected to the data storage, the processor being configured to:
      retrieve a first plurality of transmit and receive message synchronization times associated with a first two-way synchronization message between a first anchor and a second anchor, wherein the first anchor comprises a first clock and the second anchor comprises a second clock; and wherein the first plurality of transmit and receive message synchronization times are associated with the first clock;
      retrieve a second plurality of transmit and receive message synchronization times associated with the first two-way synchronization message between the first anchor and the second anchor, wherein the second plurality of transmit and receive message synchronization times are associated with the second clock;
      retrieve a third plurality of transmit and receive message synchronization times associated with a second two-way synchronization message between the first anchor and the second anchor, wherein the third plurality of transmit and receive message synchronization times are associated with the first clock;
      retrieve a fourth plurality of transmit and receive message synchronization times associated with the second two-way synchronization message between the first anchor and the second anchor, wherein the fourth plurality of transmit and receive message synchronization times are associated with the second clock;
      determine a clock skew and a clock offset based on the first, second, third and fourth plurality of transmit and receive message synchronization times, wherein the clock skew and clock offset correspond to the relationship between the first clock and the second clock; and
   transmit the clock skew and the clock offset to at least one of the first anchor and the second anchor.

2. The apparatus of claim 1,
   wherein the first plurality of transmit and receive message synchronization times comprises a first transmit time representing the time stamp of when a first synchronization message is transmitted from the first anchor to the second anchor and a first receive time representing the time stamp of when a first reply synchronization message is received from the second anchor by the first anchor;
   wherein the second plurality of transmit and receive message synchronization times comprises a second receive time representing the time stamp of when the first synchronization message is received from the first anchor by the second anchor and a second transmit time representing the time stamp of when the first reply synchronization message is transmitted from the first anchor to the second anchor;
   wherein the third plurality of transmit and receive message synchronization times comprises a third transmit time representing the time stamp of when a second synchronization message is transmitted from the first anchor to the second anchor and a third receive time representing the time stamp of when a second reply synchronization message is received from the second anchor by the first anchor;
   wherein the fourth plurality of transmit and receive message synchronization times comprises a fourth receive time representing the time stamp of when the second synchronization message is received from the first anchor by the second anchor and a fourth transmit time representing the time stamp of when the second reply synchronization message is transmitted from the first anchor to the second anchor;

wherein the first two-way synchronization message comprises the first synchronization message and the first reply synchronization message; and wherein the second two-way synchronization message comprises the second synchronization message and the second reply synchronization message.

3. The apparatus of claim 1, wherein the processor is further configured to:
   determine a first time of arrival of a tag message received at the first anchor;
   determine a second time of arrival of the tag message received at the second anchor;
   determine a third time of arrival of the tag message received at a third anchor; and
   determine a tag location associated with the tag message based on the first time of arrival, the second time of arrival, the third time of arrival, the clock skew and the clock offset.

4. The apparatus of claim 3, wherein the determination of the tag location comprises adjusting at least one of the first time of arrival and the second time of arrival based on the clock skew and the clock offset.

5. A system for providing object localization, the system comprising:
   a plurality of participating anchors, each of the plurality of participating anchors comprising a corresponding one of a plurality of reference clocks, each of the plurality of participating anchors being configured to:
      transmit a first plurality of synchronization messages, wherein at least a subset of the first plurality of synchronization messages are transmitted using a spreading code sequence;
      record a first plurality of transmission times corresponding to the transmission times of the first plurality of synchronization messages based on the corresponding one of the plurality of reference clocks;
      receive a second plurality of synchronization messages;
      record a second plurality of reception times corresponding to the reception times of the second plurality of synchronization messages based on the corresponding one of the plurality of reference clocks; and
      determine a time of arrival associated with reception of a tag message based on the corresponding one of the plurality of reference clocks; and
   a tracking server, the tracking server being communicatively connected to the plurality of participating anchors and being configured to:
   determine a plurality of clock skew and clock offset pairs associated with a corresponding plurality of anchor pairs based on at least a subset of the first plurality of transmission times and at least a subset of the second plurality of reception times, wherein the anchor pairs are selected from a plurality of participating anchors;
   determine a first plurality of time of arrivals corresponding to the time of arrival determined at at least three of the participating anchors; and
   determine a tag location associated with the tag message based on the first plurality of time of arrivals and the plurality of clock skew and clock offset pairs.

6. The system of claim 5, wherein each of the plurality of participating anchors is represented in at least one of the plurality of anchor pairs.

7. The system of claim 5, wherein at least a subset of the first plurality of synchronization messages are transmitted using a round robin transmission sequence.

8. A method for providing object localization, the method comprising:
   at a processor communicatively connected to a data storage, retrieving a first plurality of transmit and receive message synchronization times associated with a first two-way synchronization message between a first anchor and a second anchor, wherein the first anchor comprises a first clock and the second anchor comprises a second clock; and wherein the first plurality of transmit and receive message synchronization times are associated with the first clock;
   retrieving, by the processor in cooperation with the data storage, a second plurality of transmit and receive message synchronization times associated with the first two-way synchronization message between the first anchor and the second anchor, wherein the second plurality of transmit and receive message synchronization times are associated with the second clock;
   retrieving, by the processor in cooperation with the data storage, a third plurality of transmit and receive message synchronization times associated with a second two-way synchronization message between the first anchor and the second anchor, wherein the third plurality of transmit and receive message synchronization times are associated with the first clock;
   retrieving, by the processor in cooperation with the data storage, a fourth plurality of transmit and receive message synchronization times associated with the second two-way synchronization message between the first anchor and the second anchor, wherein the fourth plurality of transmit and receive message synchronization times are associated with the second clock;
   determining, by the processor in cooperation with the data storage, a clock skew and a clock offset based on the first, second, third and fourth plurality of transmit and receive message synchronization times, wherein the clock skew and clock offset correspond to the relationship between the first clock and the second clock; and
   transmitting, by the processor in cooperation with the data storage, the clock skew and the clock offset to at least one of the first anchor and the second anchor.

9. The method of claim 8,
   wherein the first plurality of transmit and receive message synchronization times comprises a first transmit time representing a time stamp of when a first synchronization message is transmitted from the first anchor to the second anchor and a first receive time representing a time stamp of when a first reply synchronization message is received from the second anchor by the first anchor;
   wherein the second plurality of transmit and receive message synchronization times comprises a second receive time representing a time stamp of when the first synchronization message is received from the first anchor by the second anchor and a second transmit time representing a time stamp of when the first reply synchronization message is transmitted from the first anchor to the second anchor;
   wherein the third plurality of transmit and receive message synchronization times comprises a third transmit time representing a time stamp of when a second synchronization message is transmitted from the first anchor to the second anchor and a third receive time representing a time stamp of when a second reply synchronization message is received from the second anchor by the first anchor;

wherein the fourth plurality of transmit and receive message synchronization times comprises a fourth receive time representing a time stamp of when the second synchronization message is received from the first anchor by the second anchor and a fourth transmit time representing a time stamp of when the second reply synchronization message is transmitted from the first anchor to the second anchor;

wherein the first two-way synchronization message comprises the first synchronization message and the first reply synchronization message; and wherein the second two-way synchronization message comprises the second synchronization message and the second reply synchronization message.

10. The method of claim 9, wherein the determination of the clock skew and the clock offset comprises an equation based on the relationship between the clock skew, the clock offset, a time of flight value, the first transmit time and the first receive time.

11. The method of claim 8, wherein the method further comprises:
  determining, by the processor in cooperation with the data storage, a first time of arrival of a tag message received at the first anchor;
  determining, by the processor in cooperation with the data storage, a second time of arrival of the tag message received at the second anchor;
  determining, by the processor in cooperation with the data storage, a third time of arrival of the tag message received at a third anchor;
  determining, by the processor in cooperation with the data storage, a tag location associated with the tag message based on the first time of arrival, the second time of arrival, the third time of arrival, the clock skew and the clock offset.

12. The method of claim 8, wherein the determination of the tag location comprises adjusting at least one of the first time of arrival and the second time of arrival based on the clock skew and the clock offset.

13. A non-transitory computer-readable storage medium storing instructions which, when executed by a computer, cause the computer to perform a method, the method comprising:
  retrieving a first plurality of transmit and receive message synchronization times associated with a first two-way synchronization message between a first anchor and a second anchor, wherein the first anchor comprises a first clock and the second anchor comprises a second clock; and wherein the first plurality of transmit and receive message synchronization times are associated with the first clock;
  retrieving a second plurality of transmit and receive message synchronization times associated with the first two-way synchronization message between the first anchor and the second anchor, wherein the second plurality of transmit and receive message synchronization times are associated with the second clock;
  retrieving a third plurality of transmit and receive message synchronization times associated with a second two-way synchronization message between the first anchor and the second anchor, wherein the third plurality of transmit and receive message synchronization times are associated with the first clock;
  retrieving a fourth plurality of transmit and receive message synchronization times associated with the second two-way synchronization message between the first anchor and the second anchor, wherein the fourth plurality of transmit and receive message synchronization times are associated with the second clock;
  determining a clock skew and a clock offset based on the first, second, third and fourth plurality of transmit and receive message synchronization times, wherein the clock skew and clock offset correspond to the relationship between the first clock and the second clock; and
  transmitting the clock skew and the clock offset to at least one of the first anchor and the second anchor.

* * * * *